United States Patent [19]

Suganuma

[11] Patent Number: 4,465,340
[45] Date of Patent: Aug. 14, 1984

[54] ELECTROCHROMIC DISPLAY CELL

[75] Inventor: Kunio Suganuma, Tokyo, Japan

[73] Assignee: Citizen Watch Co., Ltd., Tokyo, Japan

[21] Appl. No.: 348,183

[22] Filed: Feb. 12, 1982

[30] Foreign Application Priority Data

Feb. 13, 1981 [JP] Japan .................. 56-19888

[51] Int. Cl.³ .............................................. G02F 1/17
[52] U.S. Cl. .................................................. 350/357
[58] Field of Search .............. 350/335, 357; 340/785; 368/82, 239, 241; 358/59, 241

[56] References Cited

U.S. PATENT DOCUMENTS

| 3,844,636 | 10/1974 | Maricle et al. | 350/357 |
| 4,257,683 | 3/1981 | Kuwagaki et al. | 350/357 |
| 4,294,518 | 10/1981 | O'Conner et al. | 350/357 |
| 4,333,715 | 6/1982 | Brooks | 350/335 |

Primary Examiner—William H. Punter
Attorney, Agent, or Firm—Bernard, Rothwell & Brown

[57] ABSTRACT

An electrochromic display cell comprising a plurality of display electrodes consisting of electrochromic substance, a reflection member, and an electrolyte, an opposing electrode which are arranged between transparent upper and lower substrates, characterized in that said display electrodes are arrangd in overlapping when viewed in plan, and said opposing electrode is arranged to operate with said respective display electrodes.

6 Claims, 4 Drawing Figures

ELECTROCHROMIC DISPLAY CELL

BACKGROUND OF THE INVENTION

1. Field of the Invention

The present invention relates to an electrochromic display cell which produces or erases the color relying upon the electrochemical oxidizing/reducing reaction. More specifically, the invention relates to the construction of an electrochromic display cell which is capable of producing many displays.

2. Description of the Prior Art

In recent years, electrochromic display cells (hereinafter referred to as EC cells) have been developed as new display cells to substitute for the conventional liquid crystalline display cells, owing to their bright display, no limitation in the viewing angle and property to store the displayed contents. The EC cell, however, does not permit multiplex driving, but is driven by a current requiring electric charge of the order of several millicoulombs per square centimeter. Therefore, resistance of lead electrodes on a substrate of the EC cell must be very small. With the conventional EC cells, therefore, great limitation had been imposed with regard to the number of display electrodes when a plurality of displays are to be made or in regard to the arrangement of the display electrodes. Consequently, only very simple patterns could be displayed or, in other words, the displaying ability was poor.

FIG. 1 is a section view of a conventional EC cell having two layers that was proposed to eliminate the above-mentioned defect. Namely, a transparent upper substrate 11 and a transparent middle substrate 12 are adhered together via sealing members 14 to constitute a first cell, and the middle substrate and a lower substrate 13 are adhered together via sealing members 15 to constitute a second cell.

A transparent lead electrode 16 for a display electrode of the first layer is formed on the upper substrate 11, a display electrode 17 of the first layer composed of an electrochromic substance (hereinafter referred to as EC substance) is formed thereon, and an opposing electrode 19 of the first layer is formed on a transparent lead electrode 18 of the first layer that is formed on the opposing surface of the middle substrate 12. The opposing transparent lead electrode 18 of the first layer is electrically connected to an opposing lead electrode 21 of the first layer on the upper substrate 11 via an electrically conductive connection member 20.

The second cell is also constructed in the same manner. That is, a transparent lead electrode 22 for a display electrode of the second layer and a display electrode 23 of the second layer composed of the EC substance are formed on the opposite side of the intermediate substrate 12, and an opposing lead electrode 25 of the second layer and an opposing electrode 26 of the second layer are formed on the opposing surface of the lower substrate 13. The opposing lead electrode 25 of the second layer is electrically connected to an opposing lead electrode 28 of the second layer on the middle substrate 12 via an electrcially conductive connection member 27. Further, a reflection member 24 is disposed between the middle substrate 12 and the lower substrate 13.

The first and second cells are filled with electrolytes 29 and 30.

In the thus constructed multi-layer cell of the conventional art, the number of display patters can be increased by increasing the number of the layers, and the displaying ability can be increased correspondingly. This, however, causes the thickness of the whole cell to be increased; i.e., the cell becomes not suited for use as a display cell in the wrist watches that must be small in size and that must be thin. Further, the opposing electrode of the first cell must be transparent so that the display electrode of the second cell can be viewed. At present, however, there is available no transparent material which satisfies electrochemical characteristics required for the opposing electrode. There has been proposed a crystallized $WO_3$ which, however, is not satisfactory in regard to the contrast of display, response speed and life. Moreover, the multi-layer cell is constructed through increased number of manufacturing steps. Consequently, the yield is poor and the manufacturing cost becomes high. Thus, the conventional EC cell of a multi-layer structure has many defects and can be used for particular applications only.

SUMMARY OF THE INVENTION

The object of the present invention is to provide an EC cell which is free of the defects inherent in the above-mentioned conventional art, which satisfies the requirements of contrast, response speed and life, and which has many layers to present a multiplicity of displays.

Another object of the present invention is to provide a practicable EC cell which has a reduced thickness, which is cheaply manufactured, which employs opposing electrodes of a material on which no limitation is imposed, and which has increased displaying ability.

DESCRIPTION OF THE PREFERRED EMBODIMENTS

Figure 2:
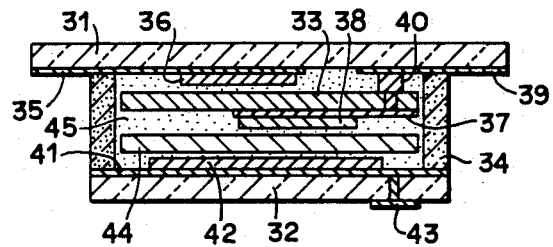
FIG. 2 is a vertical section view of a multi-layer display EC cell according to an embodiment of the present invention.

FIG. 2 is a section view illustrating the construction of an EC cell according to the present invention, in which a transparent upper substrate 31 and a lower substrate 32 are adhered together via a sealing member 34 to form a single cell. The upper substrate 31 is usually composed of a transparent glass or a transparent plastic material, the lower substrate 32 is composed of a glass, a plastic material, a ceramic or a metal, and the sealing member 34 is composed of an adhesive agent, or a plastic material, ceramic or a metal with the adhesive agent being applied to the upper and lower portions thereof. A transparent lead electrode 35 for a display electrode of the first layer and a display electrode 36 consisting of an EC substance of the first layer are formed on the upper substrate 31 like the conventional art. According to the present invention, however, the EC cell has a porous and transparent middle plate 33 which permits protons such as $H^+$ and $Li^+$ to pass therethrough easily, and on the middle plate 33 are further formed a transparent lead electrode 37 for a display electrode of the second layer and a display electrode 38 consisting of the EC substance of the second layer. The transparent lead electrode 37 for the display electrode 38 of the second layer formed on the middle plate 33 is electrically connected to a transparent lead electrode 39 which is connected to an outer portion on the upper substrate 31 via an electrically conductive member 40; i.e., the transparent lead electrode 37 for display of the second layer can be connected to an external unit.

The EC substance will be an oxide of a transition metal such as $WO_3$ or the like or a hydroxide such as $Ir(OH)_n$ or the like, the transparent lead electrode will be composed of tin oxide or indium oxide, and the middle plate 33 will be composed of a ceramic or a plastic material. On the lower substrate 32 are formed a lead electrode 41 for opposing electrode and an opposing electrode 42 in contact with the electrode 41. The lead electrode 41 for the opposing electrode is connected to an electrode 43 which is connected to the opposing electrode and which is formed on the back side of the lower substrate 32.

It is, of course, allowable to form a lead electrode on the upper substrate 31 like the conventional art to make connection to the external unit. A porous and opaque reflection member 44 is provided between the middle plate 33 and the lower substrate 32, the reflection member 44 being capable of easily passing protons therethrough. The reflection member is composed of a porous ceramic plate, a porous plastic material or a gelatinous material. The opposing electrode is made of an oxide of a transition metal, complex of iron, carbon, or a mixture thereof. The cell is filled with, for example, a carbonate solution of $LiClO_4$ which is an electrolytic solution indicated at 45, containing $H^+$, $Li^+$ and $Na^+$ ions. The electrolytic solution may be in a gelatinous form.

Figure 1:
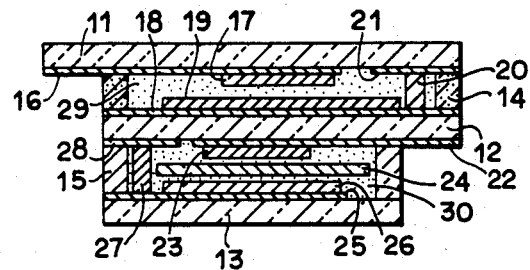
FIG. 1 is a vertical section view of a conventional multi-layer display EC cell.

With the EC cell of the two-layer display electrode construction of the embodiment of the present invention, the display can be made in a variety of manners like the conventional EC cell of the two-layer cell construction diagrammed in FIG. 1. For instance, capital letters and small letters can be displayed by the display electrode of the first layer and by the display electrode of the second layer, letters and marks can be displayed by these electrodes, or the display can be made in different colors or mixed colors can be presented by using EC substances that develop different colors. With the EC cell of the present invention, in addition to the above-mentioned features, the display electrode 36 of the first layer on the upper substrate 31 and the display electrode 38 of the second layer on the middle plate 33 are disposed close to each other compared with the conventional art.

Therefore, the display shifts back and forth very little even when it is switched. Further, reduced difference in the heights of the display electrodes helps produce the display that looks naturally. This makes a great advantage over the conventional EC cells and over the display cells of the two-layer construction employing crystals that have now been widely employed.

In the EC cell of the present invention, furthermore, a single opposing electrode 42 is commonly used for the display electrodes 36 and 38. Therefore, the opposing electrode 42 needs not be made of a transparent material if it is disposed at a position where it is shielded by the reflection member 44. It is therefore allowed to use a substance which is best suited for the opposing electrode and which is usually employed for the EC cells. Consequently, the response speed and the life become comparable with those of the conventional EC cells, making it possible to realize the EC cell having display electrodes of two layers with increased displaying capability that could not be attained with the conventional art. Further, owing to its single cellular construction unlike that of the conventional art, adhesiveness and sealing reliability of the sealing materials can be enhanced, and the total thickness of the EC cell can be greatly reduced, lending itself well for use as a display cell for the devices that must be small and thin such as wrist watches.

If the reflection member is eliminated by arraying opposing electrodes around the outer peripheral portion avoiding the display portions, it is possible to realize a multilayer display EC cell of the transmission type.

Figure 3:
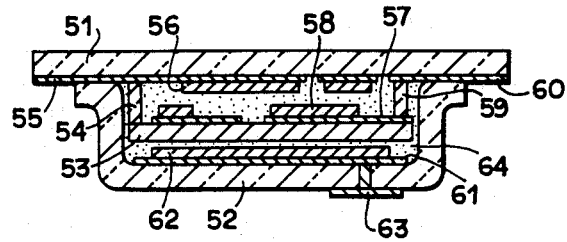
FIG. 3 is a vertical section view of a multi-layer display EC cell according to another embodiment of the present invention.

FIG. 3 is a section view illustrating another embodiment of the present invention, in which a transparent upper substrate 51 and a recessed lower substrate 52 are adhered together to form a cell. A transparent lead electrode 55 for a display electrode of the first layer and a display electrode 56 of the first layer consisting of the EC substance that are formed on the upper substrate 51, a lead electrode 61 for an opposing electrode, an opposing electrode 62 and a connection electrode 63 connected to the opposing electrode formed on the lower substrate 52, and an electrolyte 64, are all the same as those of the above-mentioned embodiment. In this embodiment, however, a display electrode 58 of the second layer consisting of the EC substance is formed on a porous and opaque reflection member 53. A lead electrode 57 for display electrode of the second layer need not be transparent but may be of the same color as the reflection member 53. The position of the reflection member 53 is limited by a spacer 54 in order to prevent the display electrode 56 of the first layer on the upper substrate 51 from being short-circuited to the display electrode 58 of the second layer 2 on the reflection member. The lead electrode 57 for display electrode 58 is connected to the lead electrode 60 on the upper substrate 51 by an electrically conductive member 59. A lead electrode 61 for an opposing electrode need not be transparent like the above-mentioned embodiment and, hence, a thin film or a thin plate of gold or titanium is used for the lead electrode 61. In this embodiment, no middle plate is present, and the thickness of the EC cell can be more reduced than that of the above-mentioned embodiment.

Figure 4:
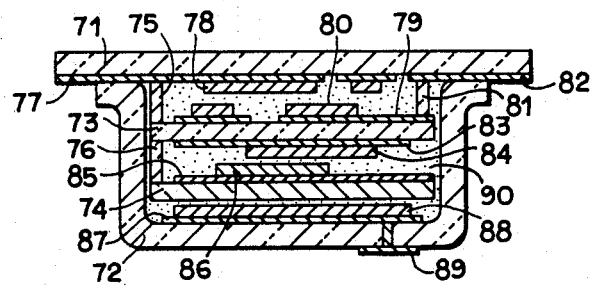
FIG. 4 is a vertical section view of a multi-layer display EC cell according to a further embodiment of the present invention.

FIG. 4 is a section view showing a further embodiment according to the present invention, in which four layers of display electrodes are provided to greatly enhance the displaying capability. A transparent upper substrate 71 and a lower substrate 72 are adhered together to form a cell.

A display electrode 78 of the first layer, a transparent lead electrode 77 for a display electrode of the first layer, an opposing electrode 88, a lead electrode 87 for an opposing electrode, a connection electrode 89 connected to the opposing electrode and an electrolyte 90 are all the same as those of the above-mentioned embodiment (FIG. 3). In this embodiment, provision is made of a porous and transparent middle plate 73 and a porous reflection member 74. On both surfaces of the middle plate 73, there are provided a display electrode 80 of the second layer, a transparent lead electrode 79 for a display electrode of the second layer, a display electrode 84 of the third layer, and a transparent lead electrode 83 for a display electrode of the third layer, and on the reflection member 74, there are provided a display electrode 86 of the fourth layer and a lead electrode 85 for the display electrode of the fourth layer. The lead electrodes for display electrodes are connected to their corresponding lead electrodes 82 on the upper substrate 71 via electrically conductive members 81. Further, spacers 75 and 76 are provided so that the display electrodes are not short-circuited among the layers.

The spacers 75 and 76 may be partially provided along the outer peripheral portion, or a transparent and porous film or a transparent and porous plate may be inserted throughout the whole surfaces among the layers. According to the cell having four layers of display electrodes of this embodiment, the thickness is increased by an amount whcih nearly corresponds to the thickness of the middle plate 73. In other words, it is possible to easily provide a thin EC cell having a great displaying ability. In this embodiment, also, the opposing electrode 88 commonly works for the display electrodes and can be easily connected to an external unit. It is also possible to provide a multi-layer display EC cell having five or more layers.

According to the EC cell of the present invention as mentioned above, the display electrodes only are arrayed in a plurality of layers and, hence, the opposing electodes need not be transparent. It is therefore allowed to prepare the opposing electrodes using the same material as that of the conventional EC cells, making it possible to provide an EC cell of the multi-layer display which satisfies the requirements of contrast, response speed and life, while offering more display. Moreover, owing to its single cellular construction, the EC cell of the present invention has reduced thickness, has increased reliability, and is cheaply manufactured.

What is claimed is:

1. An electrochromic display cell comprising:
   (a) a transparent upper substrate;
   (b) a lower substrate arranged in parallel with said upper substrate;
   (c) an electrolytic substance interposed between said upper and lower substrates;
   (d) a transparent intermediate substrate arranged in the interior of said cell;
   (e) a reflection plate interposed between said intermediate and lower substrates;
   (f) a first display layer having a display electrode made of an electrochromic substance provided with a transparent lead electrode, and being formed on said upper substrate;
   (g) a second display layer having a display electrode made of an electrochromic substance provided with a transparent lead electrode, and being formed on said intermediate substrate; and
   (h) a single opposing electrode provided with a lead electrode and arranged between said reflection plate and said lower substrate.

2. An electrochromic display cell as claimed in claim 1, wherein a further display layer having a display electrode made of electrochromic substance provided with a transparent lead electrode is formed on the surface of said reflection plate.

3. An electrochromic display cell as claimed in claim 1, wherein a third display layer having a display electrode made of an electrochromic substance provided with a transparent lead electrode is formed on the other side of the surface of said intermediate substrate on which said second display layer is formed.

4. An electrochromic display cell as claimed in claim 3, wherein a fourth display layer having a display electrode made of an electrochromic substance provided with a transparent electrode is formed on the surface of said reflection plate.

5. An electrochromic display cell as claimed in claim 4, wherein said intermediate substrate is supported by a spacer to maintain the given distance between said upper substrate and said reflection plate.

6. An electrochromic display cell comprising:
   (a) a transparent upper substrate;
   (b) a lower substrate arranged in parallel with said upper substrate;
   (c) an electrolytic substance interposed between said upper and lower substrates;
   (d) a reflection plate arranged in the interior of said cell;
   (e) a first display layer having a display electrode made of an electrochromic substance provided with a transparent lead electrode, and being formed on said upper substrate;
   (f) a second display layer having a display electrode made of an electrochromic substance provided with a transparent electrode lead, and being formed on said relfection plate;
   (g) said reflection plate being secured to the upper substrate by a conductive member, and an external electric signal being introduced to the display electrode on said reflection plate through said conductive member; and
   (h) a single opposing electrode provided with a lead electrode and arranged between said reflection plate and said lower substrate.

* * * * *